United States Patent [19]

Kotalik et al.

[11] 4,189,765

[45] Feb. 19, 1980

[54] DIGITAL CONTROLLER

[75] Inventors: Richard J. Kotalik, Santa Ana, Calif.; Dale E. Lupfer, Houston, Tex.; Rique L. Pottenger, Los Angeles, Calif.

[73] Assignee: Robertshaw Controls Company, Richmond, Va.

[21] Appl. No.: 890,330

[22] Filed: Mar. 27, 1978

[51] Int. Cl.[2] .............................................. G06F 15/46
[52] U.S. Cl. .................................... 364/120; 364/103; 364/900
[58] Field of Search ............... 364/120, 107, 119, 103, 364/514, 200 MS File, 900 MS File

[56] References Cited

U.S. PATENT DOCUMENTS

| 3,971,000 | 7/1976 | Cromwell | 364/200 |
|---|---|---|---|
| 3,976,981 | 8/1976 | Bowden | 364/900 |
| 3,987,351 | 10/1976 | Appelberg | 364/120 X |
| 4,001,807 | 1/1977 | Dallimonti | 364/120 X |
| 4,064,394 | 12/1977 | Allen | 364/107 |

OTHER PUBLICATIONS

"Taylor's Mod III Process Control System", Control Engineering, vol. 23, No. 4, pp. 11-12, Apr. 1976.
Markham et al., "The IBM 1800 Control System for Direct Digital Control", 1965 IEEE International Convention Record, pp. 124-134.

Primary Examiner—Joseph F. Ruggiero
Attorney, Agent, or Firm—Fulwider, Patton, Rieber, Lee & Utecht

[57] ABSTRACT

A digital controller is provided for a process control system having a centralized display of process variables and parameters, which allows an operator to alter some or all of the parameters. The controller includes both a digital display and an analog display. The digital display allows instant response to inquiries concerning a wide number of operating prameters and conditions, while the analog display provides a continuous display of the major variables and parameters.

41 Claims, 6 Drawing Figures

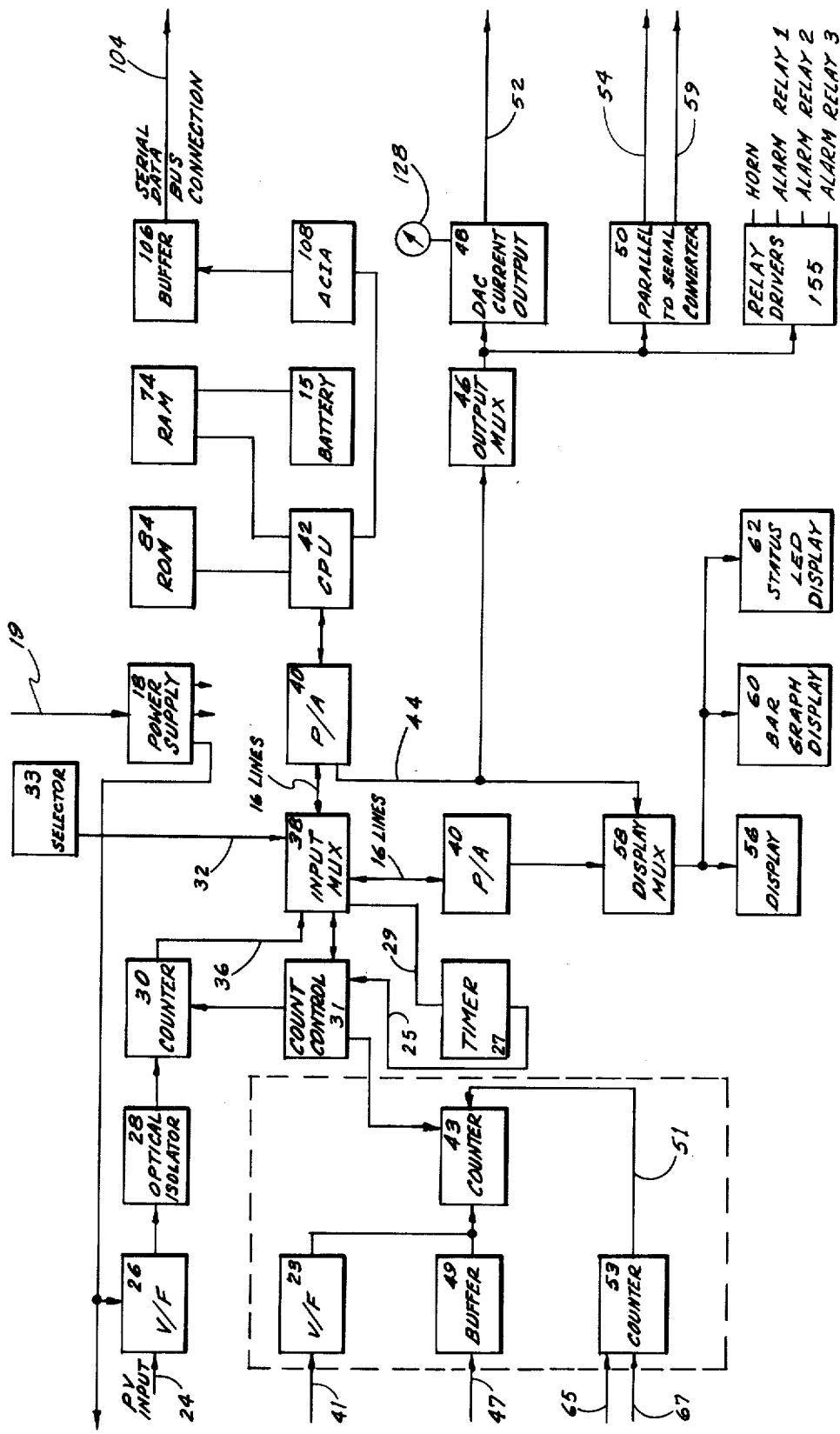

DIGITAL CONTROLLER

BACKGROUND OF THE INVENTION

1. Field of the Invention

The present invention relates to process controllers for use in monitoring and altering process control variables, such as temperature, pressure and flow rate.

2. Description of the Prior Art

Process control has heretofore been implemented using primarily analog servo control mechanism display meters. While the controls and displays have been concentrated from remote connections to servo devices for central viewing and operation, the result has been a cumbersome and confusing array of displays and process adjustment devices. Consequently, it is an object of the present invention to dispense with the redundant control mechanisms and displays, and to provide in place thereof a simplified compact, multipurpose display and control arrangement.

SUMMARY OF THE INVENTION

The present invention provides a centralized process control system in which internal organization and storage of operating parameters requires no analog adjustment, but instead one which employs digital control and display. One object of the invention is to provide a multi-purpose digital display, and an adjustable accessing selector by means of which designated information can be displayed. A multi-purpose parameter alteration device is provided and is associated with the digital display, so that while the display is in view, the associated operating parameter can be altered as desired. In the preferred embodiment of the invention, parameters are displayed on an LED display in response to accessing using a pair of rotary dials, while alteration of the parameters is performed using incrementing and decrementing actuating buttons. The system is provided with an alterable memory connected to a central processor for storing digitized signals associated with the desired and actual operating parameters of the controller. As selected, particular parameters and information are read from the alterable memory and registered in a digital display. Concurrently the same signals may be placed into buffer storage, which may be altered by a manual input to the system. The contents of buffer storage are rewritten into the alterable memory so that if alteration is performed, the new value is thereby recorded in place of the previous value.

Compactness of the display controls is achieved by using two rotary dials for access to particular memory locations. Manipulation of one of the dials selects a particular radial array of address lines while operation of the other dial selects a particular ring of address lines relative to a point of origin of the first dial. In this manner polar coordinates are defined with respect to each selectable unit of information concerning operating parameters and conditions. Designation of a particular set of polar coordinates produces a unique coded signal to the alternate memory associated with particular memory locations at which the data to be displayed is stored.

A further feature of the invention is the arrangement for converting analog input signals from the process variable sensors to a digitized format. In most processes to be controlled, there is typically a considerable amount of short term minor fluctuation in the data which is indicative of process variable conditions. In conventional digital process controllers, process variable information is sampled at prescribed intervals. Sampling of successive readings is therefore likely to be different, although only to a minor extent, and hence results in a needless series of minor adjustments. In an analog control system these fluctuations are smoothed through an analog R-C network. However, such an analog filter arrangement is inconsistent with a digital control system such as that of the present invention. Accordingly, a digital filter is provided to simulate an analog R-C network.

To prevent oversensitivity to minor fluctuations yet still respond rapidly to meaningful changes the process variable signal is averaged. This averaging is achieved by using a variable frequency generator, the rate of output of which is modulated in response to a process variable signal. The frequency generator feeds a counter which is operated to count pulses over a prescribed operating interval. The tabulation of total counts over the interval thereby represents an average data value. Because the frequency rate of output of the frequency generator is varied in accordance with the minor fluctuations of data, the cumulative contents of the counter represents an average data value over a measurement interval, taking into account the minor changes that occur during the interval.

In addition to the averaging system, the process controller is also electrically isolated from the process variable inputs. By digitizing the information using a frequency generator, electrical isolation of the process variable input from the control system is easily accomplished in order to obviate problems of different ground levels of the signal sensing devices as compared with the process controller. Specifically, the frequency generator that is activated by the analog process variable input is used to illuminate a LED or other optical display device. A light sensitive resistor or transistor is arranged in optical communication with the flashing LED, and transmits the pulse train impressed thereon to a digital counter.

The counter is activated by a timer to count frequency pulses throughout a prescribed interval. This interval is preferably 100 milliseconds, which is an even multiple of both 50 and 60 hertz periods. These frequencies are the conventional line frequencies by which alternating current is commercially supplied. By activating the counter for a time interval during which an even multiple of cycles of the alternating current are supplied, any hum present in the system due to the rise and fall of the alternating current wave is integrated out, since an exact number of full waves of the current are present during the counting interval.

A further object of the invention is to provide the digital collector with an isolated electrical power supply. The isolated power supply is available to power an external transmitter from the process variable input the output of which may be used to generate other signals. The feature of an isolated transmitter power supply allows a complete process variable to be transmitted with a two wire transmitter, while maintaining isolation of the process variable input.

The particular display accessing and data specification system supplied according to the present invention is arranged to allow engineering limit information to be manually provided to the system. Limit levels, minimum operating criteria, alarm threshold conditions, and other pertinent information can be both displayed and altered within the controller of the invention. In addition, other features heretofore unavailable in conventional porcess controllers are provided. Specifically, base parameters of engineering information are established in the controller memory. In most process systems it is unnecessary to alter a great number of the control parameters with any great degree of frequency. Rather, a selected few significant parameters are normally adjusted. Occassionally, however, minor adjustment to other parameters may be made over the course of time. Thereafter, when conditions change suddenly, it may be desirable to rapidly return to a base operating condition in which all of the parameters are established at a base level. This is done by storing the base levels of these parameters in memory, and including a means for overriding the normal control alteration system, so that upon activation of this re-instating device, the system is returned to the control of a previously selected set of base parameters.

The control device of this invention also includes a pre-wired access restriction device. Depending upon the code in the access restriction memory location, one or more of the operating parameters may be immune from adjustment by the controls of the digital processor controller. This serves as a safeguard against alternation of particular types of information by unauthorized personnel.

A further feature of the invention is the ability to establish upper and lower limits within which the process control output signal of the system must be confined. If these limits are exceeded, the magnitude of the process controller is not allowed to rise or fall above them, but instead the maximum or minimum level process control output signal is transmitted by the central processor. This prevents serious maladjustments to the system, such as opening critical valves too far, shutting off flame control valves, etc.

A further sophistication of the filtering system may also be provided with respect to the process variable input so that measurements, as they are recorded at periodic intervals, do not immediately result in alteration of the process control output signal. This allows temporary deviations in process input information to run their course, so that needless adjustments are not performed. To ensure that adequate adjustments are made, however, a function is derived which records measurement of the process variable input at prescribed intervals of time. The filter output signal is determined as a percentage of the change in the process variable during the last sample interval. That is, a percentage of the current change in the process variable input is added to the previous value. The percentage used is determined by the chosen time constant. The time constant may be adjusted, for example, from 0 to 100 seconds in 0.1 second steps.

Yet an additional feature of the invention is the provision of a permanently stored apparatus identification designation, which may be elicted from the process controller, either for use by an observer or for dispatch to a supervisory data control system. In this way, the particular identity of the machine designated is available to allow digital control signals to be directed to the proper device. This information is also useful for performing test routines, automated or otherwise, and for servicing the controller.

A further feature of the invention is the provision of a maximum allowable rate of change limitation. As the process data inputs are received, the rate of change between successive inputs is compared against a maximum reasonable limit. Changes at a rate greater than this limit indicate a failure in the system. For example, some process control systems deal with large quantities of liquids, perhaps several thousand gallons in a single processing vat. A large temperature rise, such as twenty degrees or more in this liquid within a matter of a few seconds, would be a most improbable event. Almost certainly, recordation of such an input would be attributable to a malfunction in the system. Accordingly, the digital controller senses such improbable occurrences, and registers an alarm condition in response thereto while suppressing corrective signals for such gross irregularities.

The digital process controller of the invention contemplates the use of a manual analog input device, signals from which are converted to encoded decimal form. A further feature of the manual adjustments provided is that they are preferably achieved through slewing switches, which increment or decrement a control setting currently accessed in the digital controller. Preferably, the system does not respond linearly to actuation of one or the other of the slewing switches. Rather, the magnitude of change effectuated by the slewing switches varies exponentially with elapsed time following initial activation. Thus, if a large adjustment is to be made, excessive time is not lost while making the initial adjustment at values that differ markedly from the desired value. Rather, the change effectuated by operation of the slewing switches is doubled following initial actuation thereof. By effectuating a degree of alteration proportional to the square, or some other exponential power, of elapsed time, the time required for the adjustment process is shortened considerably. Although undoubtedly overshoots and undershoots will occur while making large adjustments, these conditions can be readily corrected by activating the appropriate slewing button following momentary deactivation. Each new activation resets the slew rate to the initial rate, which is relatively slow.

Preferably, certain alarms, which may be audible or visual alarms are associated with deviation of particular process variables beyond prescribed limits. Alarm sensors are provided to detect deviation of these process variable inputs beyond acceptable limits. An alarm, once sounded is preferably immune from minor process fluctuations. That is, and as previously mentioned, process variables do tend to exhibit motor sporadic variations. Should these variations occur in the vicinity of an alarm limit, the alarm would be sporadically activated and deactivated, thus creating considerable confusion to those charged with monitoring the system. Accordingly, once activated, migration of the subject process variable must return to within prescribed margins before the alarm will be deactivated. Typically a margin of about two percent of the full scale value is established for this purpose, and is adjustable. That is, if a process variable exceeds a predetermined limit, it must return to within that limit by at least two percent before the alarm will be deactivated.

While contemplating the use of an audible alarm, preferably some type of silencing switch is provided so that once alerted, a monitoring operator can remove the audible alarm to better concentrate on corrective measures which should be taken.

An additional desirable feature of the invention is the provision of a testing mechanism which allows the alarm indicators and audible alarm devices to be tested to ensure that they are operable. This prevents an alarm from going undetected merely because an alarm indicator has failed.

In a variation of an application of the invention, the process controller may be operated as a slave monitoring device, with principal control being performed from a centralized supervisory controller. In this mode, the process controller of the invention performs corrections to process variables and alterations to coefficients or limits, as directed by the centralized supervisory controller. In addition, it monitors the sensors associated with the process control system, and also the inputs to the control system provided by the centralized controller. Should the centralized controller be removed from operation, or fail, control of the system is returned to the controller of the invention, with the last available value from either the centralized process control system or from the monitored processing stream itself serving as the initial set point control input.

The accompanying drawings further illustrate the concept and operation of one embodiment of the invention.

DESCRIPTION OF THE DRAWINGS

FIG. 2 is an elevational view of the side digital control panel.

FIG. 3 is an elevational view of the front analog control panel.

FIG. 4 is a block diagram of the operating components of the digital process controller.

DESCRIPTION OF THE EMBODIMENT

Figure 1:
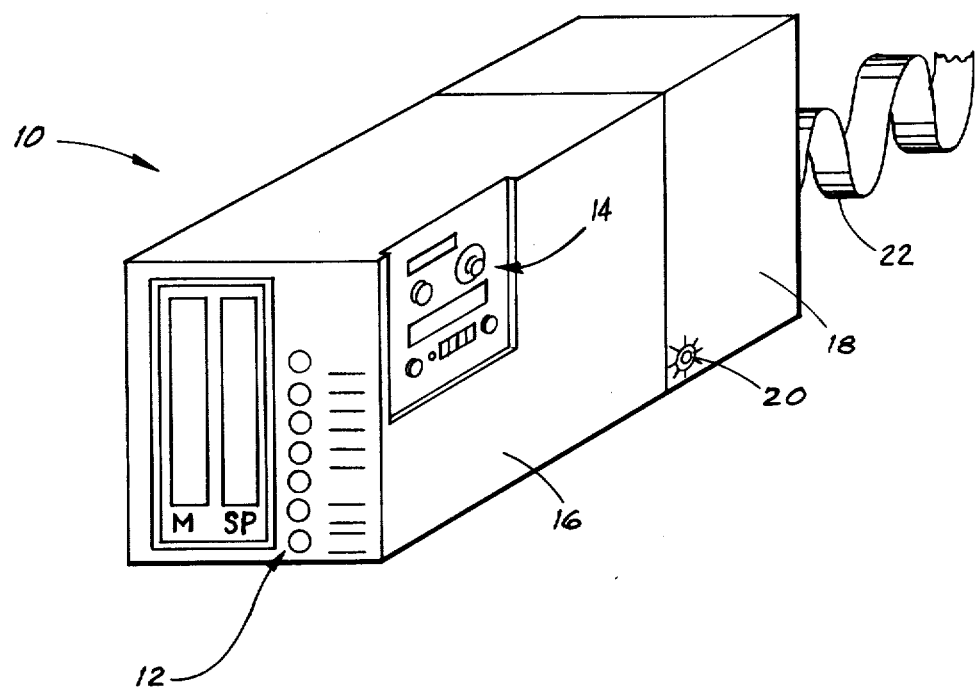
FIG. 1 is a perspective view of the physical structure of one embodiment of a digital process controller.
Figures 2, 3:
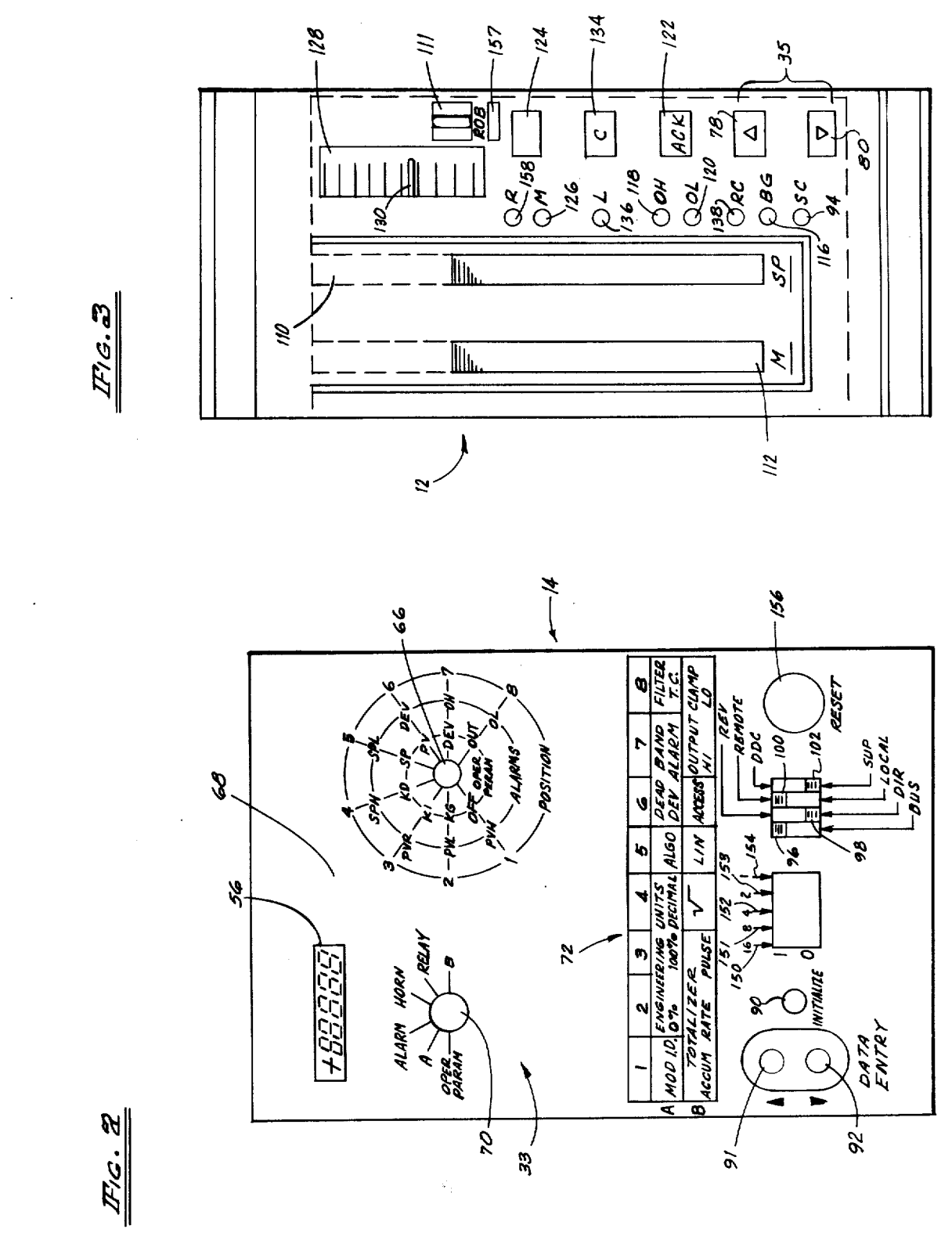

FIG. 1 illustrates a digital process controller physically formed generally in the shape of a rectangular prism and which is normally adapted to move in reciprocal fashion in a bay, rack or drawer mounting. Preferably, three inches in width, six inches in height and 19 inches or less in depth. The front panel 12, illustrated in detail in FIG. 2 contains certain analog indicators and is always visible. The side control panel 14, illustrated in detail in FIG. 3, is accessible only when the digital process controller 10 is moved forward in its rack a sufficient distance for exposure beyond the edge of the rack. As illustrated in FIG. 1, the digital process controller 10 is constructed with the control electronics in a forward module 16 and with the unit power supply in a rear module 18, which is separable from the microprocessor control module 16. The microprocessor control module 16 normally requires adjustment, servicing or replacement with greater frequency than does the power supply module 18, so that the ability to mechanically separate the two component units allows a different microprocessor control module 16 to be inserted and operated to maintain the digital process controller 10 in service. A switch 20 associated with the power supply module 18 is employed to switch the controller 10 from automatic to manual operation, so that separation of the modules 16 and 18 does not disrupt the process.

The power supply module 18 includes a single 117 volt inlet on line 19, indicated in FIG. 4, to a transformer primary which is equipped with several secondary output windings. One of the windings supplies five volts for operation of the logic elements of the digital process controller 10. Another winding supplies a 26.5 volt D.C. supply for the rest of the circuitry of the digital process controller. A separate 26.5 D.C. voltage supply is also provided for the process variable circuitry and for the power transmitter for carrying the output transmitted from the controller 10.

It should be noted that although the power supply section 18 provides all power necessary for operation of the controller 10, the microprocessor control module 16 contains a battery 15, indicated in FIG. 4, sufficient to power the microprocessor random access memory 74 so that settings and values are not lost even though a power failure may occur.

An umbilical cable 22, depicted in FIG. 1, is employed for data transmission from the microprocessor control module 16 to the various valves, thermal pumps, and pressure lines that may be operated by the digital controller 10. Although connected to the power supply module 18, the terminals of the several wires in the umbilical cable 22 are interconnected to the microprocessor control module 16 by means of pin connections. Preferably, the logic and data manipulation required is performed using a model 6800 microprocessor, manufactured by Motorola Corporation, which is located in the module 16.

The essential logic and data manipulation components of the invention are depicted in FIG. 4. The process controller 10 includes process variable signal conversion means for receiving and digitizing an analog process variable input signal indicated at 24. This signal conversion system employs a voltage to frequency converter 26 which provides an output to an optical isolator 28, which in turn is connected to a thirteen bit counter 30.

As a standard of comparison for the process variable input 24 a means for altering the digitized set point control signal is provided to the microprocessor at 32 from a manual input adjusting selector arrangement, indicated generally at 33. The selector arrangement 33 includes both the selectors of FIGS. 2 and 3. Manual inputs to the system through the control panels 12 and 14 are thereby digitized to form the process input control signal 32.

The digitized set point or other process control input signal 32 and the digitized form of the analog process variable input signal 24, which appears at 36, are transmitted through a multiplexing unit 38 and through a peripheral interface adapter 40 as inputs to a central processor 42. The central processor 42 receives the digitized process control input signal 32 and the digitized process variable input signal 36, and after performing the appropriate logic and processing operations, generates an error correction output signal which is directed through the peripheral interface adapter 40 and transmitted on line 44 to an output multiplexer 46. The multiplexer 46 directs output information either to a digital to analog converter 48 or to a parallel to serial converter 50, and also to horn and alarm relay drivers 155. The respective outputs 52 and 54 from the converters 48 and 50 may be used, in alternative connections, to control the process variable.

The digital process controller 10 also includes a digital display circuit 56 which receives information through a display multiplexer 58 from the central processor 42 through the peripheral interface adapter 40. The digital display 56 is used to selectively display digital representations of the manually generated control signals provided to the system through the control panels 12 and 14, and also the digitized process variable signal from line 36. In addition to the digital display 56, which may be located in either the analog control panel 12 or the digital control panel 14, the display output also includes a bar graph display 60 and a status LED display 62, both of which are located in the analog control panel 12.

The digital control panel 14 is depicted in detail in FIG. 2. The control panel 14 includes a manually adjustable accessing selector 33 which is connected to an array of access lines arranged in a polar coordinate matrix, each address line lying along one of a plurality of radians and at one of a polarity of concentric rings defined with respect to an origin which is the axis of rotation of the rotary dial 66, included as part of the accessing selector 33. The face of the digital display panel 14 is covered with a mask 68 which includes accessing information thereon in the form of a table 72 and over which the dial 66, and a second dial 70 are positioned.

The rotational position of the dial 66 specifies one of the radians of address lines emanating therefrom and indicated on the mask 68. These radians are numbered 1-8 in the embodiment depicted. The rotary position of the dial 70 specifies one of the rings of address lines centered about the dial 66 and imprinted on the mask 68. The dial 70 thereby specifies a type of display request, as to whether operating parameters, alarm or horn thresholds, or sets of programmed limits of process variables, indicated by the letters A and B in table 72, are to be displayed. The particular nature of engineering programmed limits associated with the settings A and B of the rotary dial 70 and the several radians 1-8, designated by the position of the rotary dial 66, are indicated in an imprinted table or matrix at 72 on the mask 68.

The address lines from the dials 66 and 70 are used to encode the selected input as a digital address to an alterable memory, which preferably is a 256 by 8 bit C-MOS random access memory 74 indicated in FIG. 4. The code transmitted to the RAM 74 accesses a particular digitized signal for display in the six position LED display 56. The RAM 74 stores all of the digitized signals associated with each of the settings of the dials 66 and 70 and responds to adjustment of those dials to display a digitized representation of a selected signal.

The error correction output signal on line 44 is derived from an algorithm having components of proportional gain, and integral and derivative transfer functions. The set point error signal is computed as follow:

$$A_n = \frac{\sum\limits_{k=n-9}^{n} S_k}{10} - \frac{\sum\limits_{k=n-19}^{n} S_k}{10}$$

In accessing information for display from the RAM 74 of FIG. 4, the dial 70 may be directed to the OPER PARAM setting in FIG. 2. If the dial 66 is directed to radian 2, the gain constant P, or KG as it appears on the dial, is displayed. The gain constant may be altered by depression of one of the slewing data entry buttons 91 or 92 located in the digital control panel 14. As the gain constant changes, its value will be continuously updated in the digital display 56. When it reaches the desired value, release of the depressed incrementing data entry slew button 91 or the decrementing data entry slewing button 92 will freeze the value of the gain constant and maintain that value in the RAM 74. That value will continue to appear in the display 56 until the dial settings are altered.

When the dial 66 is rotated clockwise from the KG position to the KI position, the integral time constant KI likewise will appear in the display 56, and can be altered by depression of either of the slew buttons 91 or 92. Likewise, the deriative gain constant D can be displayed by continued clockwise rotation of the dial 66 to the KD position.

Rotation of the dial 66 to the SP position will display and allow alternation of the set point toward which the process variable is directed using either the slewing buttons 91 and 92 or slewing buttons 78 and 80. Continued clockwise rotation of dial 66 to the PV value will display the stored digital representation of the process variable input. However, since this value is not subject to manual alteration, but rather is indicative of an actual flow condition, it cannot be varied by manual entries through either the digital control panel 14 or the analog control panel 12. Rotation of the dial 66 to the DEV position will display a digital representation of the deviation signal DEV transmitted on line 44. Like the process variable input signal, the deviation signal DEV cannot be altered manually. Rotation of the dial 66 to the OUT position will display a digital representation of the error correction output signal that appears at 52 in FIG. 4.

Rotation of the dial 70 to the position designated A causes selection of the operating parameter information appearing in the horizontal row A and in the vertical column corresponding to the radian to which the dial 66 is set in table 72. When the dial 66 is set to radian 1 and dial 70 is in the position A, the system will display the controller identification.

$$E = P \frac{[e_n - e_{n-1}] + [e_n(dT)/60(I)] + [5A_n + 4A_{n-10} + 3A_{n-20} + 2A_{n-30} + A_{n-40}] \, (4D)}{dT}$$

where
  P = Proportional gain
  I = Integral gain (minutes)
  D = Derivative gain (minutes)
  dT = Sample interval (100 ms)
  $e_{n-1}$ = Error at last sample time, (% of scale)
  $S_n$ = Current measurement, (% of scale)
  $S_{n-1}$ = Measurement at last sample time, (% of scale)

This identification number is a number stored in the alterable memory after being read from the rocker switches 150-154, which appear on the face of the front panel 14, and is an apparatus identification designation. The display 56 responds to the code from the output of the selector arrangement 33 to the central processing unit 42. With the rotary switches 66 and 70 as indicated, the code elicits the apparatus identification designated in binary by the switches 150-154 and transmits it in decimal for display in the visual display 56. This information is useful for servicing the digital process controller 10 and also for addressing remotely located digital process controllers from central control units. The identification number may be an integral number between 0-31.

When the dial 66 is set to radian 2 and dial 70 is in the position A, the system will display the value in engineering units of the lowest limit of the process variable. This value corresponds to 0% of the allowable range of the process variable. Similarly, rotation of the dial 66 to the radian labelled 3 will cause the highest limit value in engineering units of the process variable to appear on the digital display 56. This value corresponds to a percentage extreme of 100 percent. When entered, the values in row A in columns 2 and 3 are used to derive a conversion factor from the low and high limits. This conversion factor is stored in the RAM 74. The central processor 42 utilizes this stored conversion factor to develop for display in engineering units, the digitized process variable input signal 36, the process control alteration signal 32, which is the set point signal, and the difference between these two. Conversion between engineering units and percentages for viewing on the display 56 is performed by the central processing unit utilizing permanent arithmetic function parameters stored in the 4,096 by 8 bit read only memory 84.

Rotation of the dial 66 to the radian numbered 4 while the dial 70 is in the A position selects how many digits will appear to the right of the decimal point in the display 56. As few as zero or as many as five positions may be selected. Therefore, if the engineering unit decimal is set to 2, and an engineering unit zero percent is set to $-100.00$ and the engineering unit of 100 percent is set to 100.00, the set point and PV will read from $-100.00$ to 100.00. If the engineering unit decimal were changed to 1, the readings would range from between $-1,000.0$ to 1,000.0. The engineering unit displays will not allow the zero percent and 100 percent values to be brought closer together than 4095 or further apart than 40950 (ignoring the decimal point). This is because values internally within the system have a 0-4095 range (12 bits). Consequently, a display range less than 4095 will compress values and cause a loss of resolution. A display range of greater than 40950 will spread values too far apart, thereby giving spurious accuracy. Therefore if, for example, a range of 1 to 5 is desired, then the entries in the first three engineering units positions in row A in table 72 must be 1.0000, 5.0000 and 4.

Movement of dial 66 to radian 5 with dial 70 in the A position causes the system to select an algorithm from among possible algorithms. Selection may be zero, which is the conventional, linear, integral, deriative algorithm noted above in which the three components are not interactive. A code of "2" will select a linear-integral-deriative algorithm with error squared while selection "1" will produce a linear-integral-deriative algorithm with deviation dead band.

The dead band may be set when the dial 70 is at A, and the dial 66 is turned to radian 6. The range of the deviation dead band may be selected from 0.00 to 100.00, which corresponds to a percentage between the low and high limits. With the dial 66 turned to position 7, an alarm dead band may similarly be displayed and adjusted for the relay drivers 155 in FIG. 4.

Figure 5:
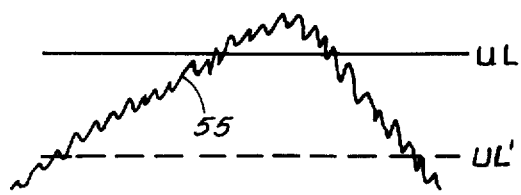
FIG. 5 illustrates diagrammatically shifting of the alarm margin once an upper limit has been reached.

Typically, in process flow systems there are relatively small sporadic variations in a process variable within a general pattern of increase, steady state, or decrease of the process variable. This fluctuation of the process variable is depicted in FIG. 5 by the curve 55. Therefore, when a process variable, for example, rises to its upper limit, indicated at UL in FIG. 5; it does not cross the upper limit and remain above the upper limit. Rather, the process variable is likely to hover at the upper limit, sometimes rising above it and sometimes falling below it. In a typical alarm system, this causes sporadic activation and deactivation of the alarm system. According to the present invention, however, when the sensing device for detecting deviation of the process variable input signal relative to the process control input signal senses movement of the process variable beyond prescribed limits, it registers an alarm condition and concurrently displaces the upper limit UL downward to a new margin indicated at UL. This displacement is preferably by an amount about equal to two percent. Conversely, when lower limits are reached, a return to a condition which will silence an alarm requires a rise of the process variable not merely to the original lower limit, but to a slightly elevated lower limit displaced upward by a marginal amount.

In this manner, the central processor 42 activates an alarm indicator whenever the process variable input exceeds a limit associated therewith, and deactivates the alarm indicator whenever that process variable returns to within a range defined between upper and lower limits by more than a prescribed transition margin. Display of the margin or dead band information in column 7 of row A of the table 72 in FIG. 2 appears in the digital display 56 with corresponding settings of dials 66 and 70. The margin may be altered by use of the data entry slew buttons 91 and 92. This margin or dead band applies to all of the alarms, and may range from 0.00 to 100.00.

The coordinate position of row A, column 8 indicates the time constant of the process variable filter. The system requires a means for filtering the process variable input 24 by recording measurements thereof at periodic intervals as the process variable input is received by the digital process controller 10. Accordingly, a function of the process variable input is derived for use in generating the process control output signal on line 44. The recorded measurements of the process variable input are determined as a percentage of the current charge. This digital filtering simulates the treatment given to input signals in analog R-C filters. The time constants are adjustable on the control panel. The time constant is adjustable between 0 and 100 seconds in 0.1 second increments.

When the dial 70 is in ALARM position, the concentric band 73 labelled ALARMS and centered about the dial 66 is used to show which alarm limit is selected. The abbreviations are as follows: PVH-PROCESS VARIABLE HIGH: PVL-PROCESS VARIABLE LOW; PVR-PROCESS VARIABLE RATE OF CHANGE in percent over 0.1 seconds; SPH-SET POINT HIGH; SPL-SET POINT LOW; DEV-DEVIATION; OH-OUTPUT HIGH; OL-OUTPUT LOW. Thus, for example, with the dial 70 at the ALARM position and the dial 66 at radian 4, the high limit for the set point is displayed. Values are in percentage of full scale. The same labels on the dial 66 are used for the HORN and RELAY positions of the dial 70 as for the ALARM position. In the horn position, a "1" causes the horn output to operate when the alarm selected is tripped, while a "0" means that it will not. In the relay position, the value entered decides which output relay driver (if any) is operated when the alarm goes off. Values and meanings are as follows: 0—no alarm driver operated; 1—alarm driver number 1 operated; 2—alarm driver number 2 operated; and 3—alarm driver number 3 operated.

For example, if the dial 70 is set to HORN and the dial 66 is set to OH, and the value in the digital display 56 is set to one, then when the output reaches its high limit the horn output will be activated. If the values at the dial positions RELAY and SPL and RELAY-OL are both set to 2, then alarm driver number 2 will be activated when either the set point or the error correction output signal reaches its low limit.

When the dial 70 is in position B, the position of the dial 66 selects the values in the vertical column designated thereby in row B of the table 72. Movement of the dial 66 to radian 1 elicits the information at column 1 of row B in table 72. The information appearing in response thereto at digital display 56 shows the running accumulator total of the process variable, which progresses from 0 to 99999 and then recycles. This total accumulates at a rate which may be read and adjusted when dial 66 is turned to radian 2 with dial 90 in the B position. The rate is adjustable from 10 to 4166.6 counts per hour for full scale input. If the process variable goes below 1%, nothing is added to the total. The rate is adjustable through the data entry slewing buttons 91 and 92. The display at 56 reflects a cummulative tabulation of total process flow during a predetermined time interval. When the dial 70 is at the B position, and dial 66 is at radian number 3, and when the entry to the front panel 14 is at a "1", then there is a pulse on a relay alarm output from the relay driver 155 every time the totalizer increments. When the setting is "0", there are no such pulses.

Movement of the dial 66 to the next position indicates whether or not the square root of the process variable is being used. A value of "0" in the display 56 indicates that no square root function is employed, while a value of "1" indicates that a square root function is employed. Similarly, a linearization function may be designated when dial 66 is turned to radian 5.

In the ACCESS position at radian 6 of the dial 66, the access restriction code is displayed. Each digital process controller is provided with an access restriction code in the RAM 74 which selectively restricts access by the operator to adjustment of only prescribed information. An access code of 0 allows an operator to perform any adjustments of any parameters which he desires using the control panels 12 and 14. An access code of 1 restricts adjustment to tuning constants only, while an access code of 2 will not allow an operator to adjust any of the information stored in the microprocessor control unit 16, with the exception of the set point and output.

Figure 6:
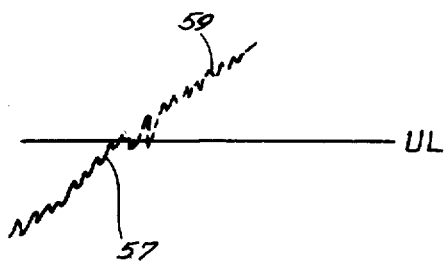
FIG. 6 illustrates diagrammatically system output as an upper output limit is reached.

The information in columns 7 and 8 of row B in table 72 denotes whether or not the error correction output signal is limited in either its high or low migration to the value designated as an alarm value. This condition is illustrated diagramatically in FIG. 6. If a code 1 appears in the display 56, the output, indicated at 57 in FIG. 6 is clamped at the alarm level UL and will hold at this limit even if the central processor would otherwise dictate further upward movement, as indicated in dashed lines at 59. A code of 0 indicates no output clamping. When output clamping is employed, the magnitude of the process control output signal on line 44 is confined within a range established by the upper and lower alarm limits despite a process variable input which would otherwise call for an output beyond this range.

Further digital controls in the control panel 14 are also provided independent of the dials 66 and 70. As previously explained, depression of one of the data entry push buttons 91 or 92 allows slewing of the variable displayed on the digital display 56. An initializing button 90 is provided in the digital control panel 14 to minimize the degree of adjustment required in adapting the digital process controller 10 to altered flow conditions. Depression of the initializing button 90 overrides any adjustments that have been manually made through the control panels 12 and 14 and restores a set of base parameters for operation. These base parameters are stored in either the RAM 74 of the ROM 84 or some in each. One suitable set of initial values or base parameters are as set forth below:

| | |
|---|---|
| Set point | 50% |
| Gain Constant KG | 1.0 |
| Integration Constant KI | 436.91 minutes (slowest possible) |
| Deriative Constant KD | 0.001 minutes (lowest possible) |
| Error dead band | 0% |
| All high alarms | 100% |
| All low alarms | 0% |
| Process variable alarm rate | 100% |
| Deviation alarm | 100% |
| Engineering unit 0% | .00 |
| Engineering unit 100% | 100.00 |
| Engineering unit decimal | 2 |
| Algorithm | 0 (standard) |
| Filter | 0 (none) |
| square root | 0 (not on) |
| Relays and horn for all alarms | off |
| Alarm dead band | 2% |
| Access | 1 (limited) |
| Output clamps | 1 (on) |

A reset button 156 is also provided in the digital control panel 14 to restart the microcomputer. This button returns operation of the microprocessor to the beginning of a programmed sequence and is normally used when the unit is first placed in service and following a power failure or removal of power. The reset button 156 should also be depressed if the self-check light emitting diode 94 in the analog control panel 12 is illuminated, as will be explained hereinafter.

A series of four rocker switches 96, 98, 100 and 102 are also provided in conjunction with the digital control panel 14. Movement of the switch 96 to the bus position enables the flow process to be operated under computer control. In this condition, the digital process controller 10 is essentially operating in a monitoring mode and receives a remotely generated control signal from a separate computer. This control signal is received on line 104 in FIG. 4 in a buffer storage unit 106. The buffer storage unit 106 directs the computer control information to an asynchronous communication interface adapter 108, which examines the computer control signal for acceptability, as to pulse period and number of bits and transmits it to the central processing unit 42 if it is indeed acceptable. Failure of an acceptable signal to occur causes the asyncronous communication interface adapter 108 to transmit an activation signal to the central processor unit 42. The digital process controller 10 then ignores the current message from the computer.

The switch 98 in FIG. 2 varies the error signal output on line 44 in FIG. 4 between an output which bears a direct relationship or an inverse relationship to the difference between the process variable input on line 24 and the system set point. The appropriate position of the switch is determined by the number of signal inversions occurring within the system. Switch 100 is used to provide a program option for either utilizing a set point value stored internally within the RAM 74 as influenced by settings of the digital control panel 14 and the analog control panel 12, or for utilizing a set point value established remotely by an input from a supervisory controller.

Switch 102 allows operation of the digital process controller 10 to take the value of the set point and use that as an output when in the direct digital control position. Such a mode of operation is employed where it is desired for the digital process controller 10 to serve as a backup unit only. The switch 102 is only operative when control of the system is provided by a supervisory computer which directs the central processor 42 of the digital process controller 10 to provide a specified set point as an output. When operated in this manner the digital process controller 10 does not introduce manually generated inputs from the digital control panel 14 or the analog control panel 12 into the calculations necessary to arrive at a set point error signal output. Rather, it acts merely as a conduit for the output of a supervisory computer. In this mode of operation, should the computer fail to provide an acceptable signal, upon failure of the computer to provide the digital process controller 10 with an appropriate set point value, the digital process controller 10 initially stores the last received digitized process variable input on line 36 in a RAM location as the initial set point. Thereafter, the digital process controller 10 is able to operate in response to manual inputs through the digital control panel 14 and the analog control panel 12. In the alternative setting of the switch 102, the digital process controller 10 will again assume independent operation upon failure of a computer to provide it with set point information, but rather than initially utilizing the process variable input on line 24 as a set point, it will instead utilize the last set point provided by the computer on line 104.

The analog display panel 12 is depicted in detail in FIG. 3. This display panel includes as a central feature a dual bar graph display having a scale 112 for the measurement or process variable input from line 24 and a scale 110 for the set point, the signal for which is transmitted from the central processor 42 on line 32. When the process variable exceeds its upper limit or falls below its lower unit, the scale 112 blinks and the bar graph alarm LED 116 blinks concurrently. Similarly, if the set point moves beyond its upper and lower limits, the bar graph 110 will blink as will the bar graph alarm LED 116. If the difference between the process variable and the set point exceeds a deviation alarm limit, then both bar graphs 110 and 112 blink, as well as the bar graph LED 116. If more than one alarm condition exists then any shared bar graph or LED will blink more rapidly.

If the alarm condition is caused by the error correction output signal exceeding its upper limit, an LED 118 will also blink. Conversely, if the alarm condition is caused by the error correction output signal falling below the lower limit, the LED 120 will blink. In addition to the visual displays provided by the appropriate LED's and bar graphs displays, an alarm condition will cause an audible horn to sound and for any appropriate relays to be set.

Depression of the ACK (acknowledge) push button 122 indicates that the operator is aware of the alarm condition. The depression of this acknowledge button will silence any audible alarms, and any blinking lights indicating an unacknowledged alarm will he halted. Instead the alarm indicating LED's will be illuminated continuously or will cease to be illuminated depending upon the current alarm status. Depression of the ACK push button 122 also provides a lamp and horn test. All indicating LED's and the horn output will be turned on as long as the button 122 remains in the depressed condition.

The automatic manual push button 124 and the indicator 126 associated therewith respectively determine and indicate the operating mode of the controller 10 when the controller 10 is not in computer supervised operation. The switch 124 is a two position push button switch. In the outward position the controller is in the automatic mode, while in the depressed position the controller is in a manual mode, and the LED will be on. During computer supervised operation, this switch determines the operating mode of the controller should the computer fail.

An analog output meter 128 is also provided, or alternatively, the digital display 56 could be provided on the front panel 12 in its place. If the analog meter 128 is furnished, the needle 130 will indicate the magnitude of the error correction output signal. A manual memory marker may be provided to indicate the desired output and is used when the system is operating in the manual mode. If a digital display is provided in place of the meter 128, then the digital display will show the error correction output signal for the off position of the dials 66 and 70. If the meter 128 is provided then the digital display 56 is positioned in the front panel 14, as depicted in FIG. 2. In this instance the digital display 56 will show the set point when the dial 66 is in the OFF position and dial 70 is in the OPER PARAM position.

A three position toggle switch 111 may be provided on the analog control panel 12. This switch is an option which may be used when a digital display is mounted on the control panel 12, and is used when it is desired to relate a plurality of output signals to determine how an internal set point is derived from a remotely generated set point. The switch 111 governs which of the ratio, output or bias parameters is to appear when the dial 66 is in the OFF position and the dial 70 is in the OPER PARAM position. The switch 111 also determines which of the ratio, output or bias parameters may be slewed using the buttons 78 and 80, when the dial 66 is at the OFF position and the dial 70 is at the OPER PARAM position. When the push button 157 is depressed, the LED 158 is illuminated and the central processing unit 42 multiplies the remote set point by a ratio stored in the RAM 74, adds the bias to it, and uses the result as the local set point. The bias is also stored in the RAM 74. The output is the normal error correction output signal. When the ratio push button is first pressed, the central processing unit 42 makes a first pass or initial computation of the ratio and bias utilizing the current remote set point and process variable. Thereafter the ratio and bias can be slewed as previously explained. This feature is used for "bumpless" transfer. That is, a transfer is effectuated from one signal level to another without sharp jumps or drops in signal value.

The computer-local push button 134 determines whether or not the process controller 10 is being supervised by an external computer. Successive depression of the push button 134 changes the operating condition of the system alternatively between computer and local.

When in local operation, the indicator 136 remains illuminated.

The measurement rate of change alarm indicator 138 is an LED that blinks when the process variable is altered too suddenly. The central processor 42 performs subroutines to ascertain whether or not the rate of change of the process variable is within a maximum allowable rate of change, the value of which is stored in the RAM 74. The central processor 42 compares the actual rate of change of the digitized process variable input signal 36 against the maximum allowable rate of change stored in the RAM 74. Should this rate of change be exceeded, the alarm indicator 138 will become illuminated. The alarm indicator 138 is designed to warn the operator that there is probably some malfunction in the measurement system. An excessive rate of change is normally not indicative of a true rate of change. For example, temperature changes of 20° F. or more simply do not occur within a millisecond or so in vats of liquids several hundred gallons in volume. Accordingly, an excessive rate of change is probably indicative of some failure in the measurement system.

The incrementing slew button 78 and the decrementing slew button 80 are connected to increment and decrement the desired variable at a rate that increases with time during actuation thereof. Thus, when large changes are to be made, depression of the button 78 will begin incrementing toward the value desired, but at an exponential rate with elapsed time during actuation thereof, and not at a rate linear with time. Accordingly, large changes can be made in a relatively short time. Although some overshooting or undershooting is likely to occur, correction is far less time consuming than with a linear slewing system. Also, as one approaches the desired value, momentary release of the slewing button will reset the rate at which change is effectuated by that button. Thus, as one approaches the desired value, a momentary release of the slewing button will reset the rate of change of the system to the initial rate of change which is achieved with the slewing button. This facilitates accurate alteration of desired settings. Data entry slewing buttons 91 and 92 operate in a corresponding manner.

Illumination of the self-check LED 94 indicates that the internal microcomputer is operating improperly. This alarm may be acknowledged by depression of the buttom 122. Also, the reset button 156 may be depressed in the digital control panel 14 to attempt to correct the internal malfunction. If correction is not effectuated, however, the self-check LED 94 remains illuminated and additional service is required. The cause of actuation of the LED 94 is the failure of the central processor 42 to complete a cycle of its routines within a prescribed period of time.

The voltage to frequency conversion system of FIG. 4 is a particularly advantageous feature of the invention. To compensate for errors occuring by reason of small fluctuations of a process variable which would otherwise occur in a digital system that samples the process variable at particular intervals, a voltage to frequency converter 26 is employed. The voltage to frequency converter 26 includes a variable frequency generator which produces a pulse train output, the frequency of which is modulated in response to the process variable input on line 24. This pulse train is passed to an optical isolator 28 which includes a light emitting diode connected to the voltage to frequency converter 26. A light sensitive transistor responds to the flashing of the light emitting diode to provide input pulses to a thirteen bit counter 30. One hundred millisecond timing intervals are defined by a timer 27 which provides a strobe signal to the counter 30 at the termination of each one hundred millisecond interval. A one hundred millisecond interval is chosen because this is the shortest time which is an integral multiple of both 50 and 60 hertz. By utilizing this interval, hum present in the system because of the rise and fall of the a.c. current wave, is eliminated. The strobe signal is also provided to the input multiplexer 38 through the count control circuit 31 to notify the central processing unit 42 that the counter 30 has data available. A return signal through the peripheral interface adapter 40 allows the data to be entered into the central processor 42 from the output line 36 of the binary counter 30.

As the digitized processor variable input signal on line 36 is transmitted through the input multiplexer 38, the timer 27 is reset by a signal on line 29 so that the timer 27 commences a new counting interval. The timer 27 then transmits an enabling signal on line 25 to the count control circuit 31 of 100 milliseconds duration, during which time the counter 30 is enabled to receive input pulses from the optical isolator 28.

Set point information may be provided from one of several sources. The set point information may be manually provided as previously described. Alternatively, the set point may be established from a cascaded arrangement of process controllers, and in such an instance, arrives at the digital process controller 10 on line 41 as a voltage or current signal. The signal on line 41 is directed to a voltage to frequency converter 23, which operates in essentially the same fashion as the voltage to frequency converter 26. The pulse train output of the voltage to frequency converter 23 is directed as a pulse train of from between 10.24 and 51.2 kilohertz to a thirteen bit counter 43 which operates in essentially the same fashion as the counter 30. From the counter 43, the set point information, upon interrogation through the two way multiplexer 38, is directed to the central processor 42.

Still another alternative set point input is in the form of a frequency signal on line 47. This frequency signal is transmitted as a pulse train of between 10.24 and 51.2 kilohertz and is directed to a buffer 49, which directs the pulses to the counter 43 when that counter is enabled.

Yet another alternative input of the set point is a pulse incremental input on line 51 to the multiplexer 38. This differential input is derived from an eight bit counter 53 which receives a pulse train on line 65 and a direction signal on line 67. The frequency count on line 65 is not proportional to the actual set point itself, but rather is proportional to the desired differential in the set point. For this reason, the counter 53 does not need to be as large as the counter 43.

In a similar fashion, the alternative forms of outputs may be provided by the digital to analog converter 48 and by the parallel to serial converter 50. The signal on line 52 from the digital to analog converter 48 is normally a current signal between four and twenty milliamps. However, an advantage can be achieved by employing in place thereof the parallel to serial converter 50. The output on line 54 is a pulse train indicative not of an absolute magnitude of the desired error correction output signal, but rather of a magnitude proportional to the changed desired in the error correction output signal. An accompanying directional signal on line 59 indicates the direction in which the error correction output signal should be changed. By employing the signals 54 and 59, a "bumpless" output is provided so that less drastic immediate changes are required as an immediate output when a system first comes on line or is transferred from computer to local operation.

It should be appreciated that although but a single embodiment of the invention has been depicted herein, numerous variations and modifications will undoubtedly become readily apparent to those familiar with the process system control. Accordingly, the invention should not be construed as limited to the specific embodiment depicted herein, but rather is defined in the claims appended hereto.

I claim:

1. A process controller comprising:
   process variable signal conversion means for receiving and digitizing an analog process variable input signal, and including
   a variable frequency generator frequency modulated in response to an analog voltage,
   timing means for providing a strobe signal after a prescribed period of time, and
   frequency counting means connected to said timing means and to said variable frequency generator to provide said process variable signal in digitized form as the output of said counter upon the occurrence of each strobe signal,
   set point control signal generating means for receiving manual inputs to generate a plurality of digital control signals,
   central processor means for receiving said digitized control signals and said digitized process variable input signal and for generating an error of correction output signal responsive thereto,
   digital display means for selectively displaying digital representations of said manually generated control signals and said process variable signal, and
   analog display means for displaying said process variable input signal and said set point control signal.

2. Apparatus according to claim 1 further characterized in that said digital display means includes a manually adjustable accessing selector, and further comprising alterable memory means connected to said central processor means and to said set point control signal generating means for storing all of the aforesaid digitized signals, and responsive to adjustment of said selector to display a digitized representation of a selected signal.

3. Apparatus according to claim 2 further characterized in that said manually adjustable accessing selector includes an array of address lines arranged in a polar coordinate matrix, each address line lying along one of a plurality of radians and at one of a plurality of concentric rings defined with respect to an original, and further comprising a first rotary dial for specifying one of said radians of address lines and a second rotary dial for specifying one of said rings of address lines, and encoding means for selecting a code to said alterable memory means to access a particular one of said digitized signals for display in said display means.

4. Apparatus according to claim 3 further characterized in that said rotary dials are connected for use to display operating parameters, alarm thresholds and engineering programmed limits of said process variable.

5. Apparatus according to claim 1 further characterized in that said timing means generates said strobe signal to define time periods of enablement of said frequency counting means of 100 milliseconds in duration.

6. Apparatus according to claim 1 further comprising electrical isolation means interposed between said variable frequency generator and said counter.

7. Apparatus according to claim 6 further characterized in that said electrical isolation means is an optical isolator.

8. Apparatus according to claim 1 further comprising an isolated electrical power supply.

9. Apparatus according to claim 1 further characterized in that said process variable signal is a frequency signal, and further comprising timing means for providing a strobe signal defining a counting interval of prescribed duration and frequency counting means connected to said timing means and to said variable frequency generator to provide said process variable signal in digitized form as the output of said counter at the termination of each counting interval.

10. A process controller comprising:
    a central processor for receiving a digitized process variable input signal and a digitized process control input signal and for generating a digital error correction output signal to regulate a process variable in accordance with said process control input signal,
    memory means for storing said process control input signal in digitized form,
    means for interfacing manually provided operating control information with said memory means to produce said digitized process control input signal,
    means for displaying digital representations of selected information and signals from said memory means,
    means for displaying analog representations of said process control input signal and said process variable input signal, and
    means for manually providing operating parameter information to said means for interfacing wherein base values of said operating parameters are established in said memory means, and
    means for overiding said means for manually providing operating parameters to restore said base values to operate to produce said error correction output signal.

11. A processs controller comprising:
    a central processor for receiving a digitized process variable input signal and a digitized process control input signal and for generating a digital error correction output signal to regulate a process variable in accordance with said process control input signal by combining at least one component from among a proportional function component of changes in said process variable input signal, and integral function component of the difference input between said process variable input signal and said process control input signal, and a differential function component of changes in said process variable input signal,
    memory means for storing said process control input signal in digitized form,
    means for interfacing manually provided operating control information with said memory means to produce said digitized process control input signal,
    means for displaying digital representations of selected information and signals from said memory means, and means for displaying analog representations of said process control input signal and said process variable input signal.

12. Apparatus according to claim 11 further comprising means for manually providing operating parameter information to said means for interfacing.

13. Apparatus according to claim 12 further characterized in that said means for interfacing includes access restriction means for limiting the manual provision of information to prescribed operating parameters.

14. Apparatus according to claim 12 further comprising control means responsive to said means for providing operating parameters to confine the magnitude of said error correction output signal to within a range established between upper and lower control output limits.

15. Apparatus according to claim 14 further characterized in that said means for interfacing manually provided operating parameter information includes means for independently adjusting said upper and lower control output limits.

16. Apparatus according to claim 12 further characterized in that said interfacing means includes: means for encoding low and high limits manually provided in engineering units of said process variable input signal, means for deriving a conversion factor from said low and high limits and for storing said conversion factor in said memory means, and wherein said central processor utilizes said stored conversion factor to convert said process variable input signal, said process control input signal and the difference therebetween into engineering units for viewing in said display means.

17. Apparatus according to claim 12 further characterized in that said central processor includes means for extracting the square root of said process variable input and for recording said square root in said memory means.

18. Apparatus according to claim 12 further comprising fixed memory means in which coefficients are stored for use in generating said error correction output signal.

19. Apparatus according to claim 18 further comprising register means which stores an apparatus identification designation, and said means for displaying is connected to said alterable memory means for eliciting said apparatus identification designation from said register means.

20. Apparatus according to claim 18 further characterized in that a maximum allowable rate of change designation is stored in said alterable memory means, and said central processor compares actual rate of change of said process variable input signal against said maximum allowable rate of change designation in said alterable memory means, and further comprising alarm indicating means connected to said central processor for registering a perceptible indication of occurrence of a condition during which actual rate of change exceeds said allowable rate of change.

21. Apparatus according to claim 11 further comprising incrementing and decrementing means for altering the information and signals selected for display on said means for displaying in digital and analog form.

22. Apparatus according to claim 21 further characterized in that said incrementing and decrementing means effectuate alterations at a rate that increases with time during actuation thereof.

23. Apparatus according to claim 22 further characterized in that said incrementing and decrementing means effectuate alterations at a rate that increases exponentially with elapsed time during actuation thereof.

24. Apparatus according to claim 21 wherein said analog display and manual input means further comprises alarm sensing means for detecting deviation of said process variable input signal and said process control input signal beyond limits prescribed therefor, means for manually providing alarm limit information to said means for interfacing, and wherein said analog display emits an alarm signal designating a signal which has deviated beyond its prescribed alarm limits.

25. Apparatus according to claim 24 further characterized in that said alarm sensing means produces an audible signal, and further comprising means for manually silencing said audible signal.

26. Apparatus according to claim 25 further characterized in that said alarm sensing means includes a plurality of indicators responsive to different alarm conditions, and further characterized in that said means for silencing said audible signal also tests the operability of all of said plurality of indicators.

27. Apparatus according to claim 26 further comprising means for manually and separately reversing the status of at least some of said alarm indicators.

28. Apparatus according to claim 25 further characterized in that said alarm sensing means includes a plurality of indicators, and at least some of said indicators respond to any one of several alarm conditions.

29. Apparatus according to claim 11 further characterized in that said memory means contains encoded upper and lower limits for said process control output signal, and said central processor is arranged to compare said error correction output signal against said upper and lower limits and to emit indicative signals whenever said error correction output signal deviates from within a range defined between said upper and lower limits, and further comprising perceptible alarm means responsive to said indicative signals.

30. Apparatus according to claim 11 further characterized in that low and high limits of selected ones of said signals are stored in said memory means, and further comprising alarm indicating means, and further characterized in that said central processor activates said alarm indicating means whenever any one of said selected ones of said signals exceeds a limit associated therewith, and deactivates said alarm indicating means whenever an activating one of said signals returns to within a range between said upper and lower limits by more than a prescribed transition margin.

31. Apparatus according to claim 30 further comprising means for manually adjusting the width of said margin.

32. Apparatus according to claim 11 further comprising means for accumulating said process variable input signal and manually actuable means for displaying current cummulative tabulation of total process throughput.

33. Apparatus according to claim 11 further comprising monitoring means for receiving a remotely generated control signal used to govern generation of said digital error correction output signal.

34. Apparatus according to claim 33 further comprising means for suppressing local provision of said error correction output signal, and for sensing the absence of an acceptable remotely generated error correction output signal and for responsively operating to thereafter provide said local error correction output signal in place thereof.

35. Apparatus according to claim 33 further comprising a data bus interface for connection to a computer for receiving said remotely generated control signal.

36. Apparatus according to claim 33 further comprising means for multiplying a remotely generated digital process control output signal by a ratio and additively combining a bias therewith to derive a local process control output signal.

37. Apparatus according to claim 36 further comprising means for storing said ratio and means for storing said bias and means for selectively displaying and altering said ratio and said bias.

38. Apparatus according to claim 11 further characterized in that said process control output signal represents a differential between a prior error correction output signal and a current error correction output signal.

39. Apparatus according to claim 11 further characterized in that said central processor defines a dead band distance of prescribed width and generates no change in error correction output signal when said process variable input signal lies within said dead band distance of said digitized process control input signal.

40. Apparatus according to claim 39 further characterized in that said components are derived from functions which operate upon the square of the differences between said process variable input signal and said process control input signal.

41. Apparatus according to claim 11 further characterized in that said central processor includes means for filtering said process variable input by recording measurements thereof at periodic intervals as said process variable input is received, and by deriving a function of said process variable input for use in generating said error correction output signal in which said function applies a percentage to the measurement change in variable input.

* * * * *